US011478951B2

(12) United States Patent
Lim

(10) Patent No.: US 11,478,951 B2
(45) Date of Patent: Oct. 25, 2022

(54) CUT-CREASE RULE FOR DIEBOARD

(71) Applicant: Seoul Laser Dieboard System Co., Ltd., Lake Forest, CA (US)

(72) Inventor: Kyong Chan Lim, Lake Forest, CA (US)

(73) Assignee: Seoul Laser Dieboard System Co., Ltd., San Diego, CA (US)

( * ) Notice: Subject to any disclaimer, the term of this patent is extended or adjusted under 35 U.S.C. 154(b) by 102 days.

(21) Appl. No.: 15/849,340

(22) Filed: Dec. 20, 2017

(65) Prior Publication Data

US 2018/0178477 A1 Jun. 28, 2018

Related U.S. Application Data

(60) Provisional application No. 62/437,564, filed on Dec. 21, 2016.

(51) Int. Cl.

| | |
|---|---|
| ***B31B 50/14*** | (2017.01) |
| ***B31B 50/25*** | (2017.01) |
| ***B26F 1/44*** | (2006.01) |
| ***B31F 1/08*** | (2006.01) |
| ***B26D 3/08*** | (2006.01) |

(Continued)

(52) U.S. Cl.
CPC .................. *B26F 1/44* (2013.01); *B26D 3/08* (2013.01); *B31B 50/142* (2017.08); *B31B 50/252* (2017.08); *B31F 1/08* (2013.01); *B26F 2001/4463* (2013.01); *B26F 2001/4481* (2013.01); *B31B 50/262* (2017.08); *B31B 50/36* (2017.08)

(58) Field of Classification Search
CPC .................... B26F 1/18–22; B26F 1/44; B26F 2001/4454; B26F 2001/4463; B26F 2001/4472; B26F 2001/4481; B26D 1/0006; B26D 2001/0033; B26D 2001/0053; B26D 2001/006; B26D 2001/0066; B26D 3/12; B26D 3/08; B31F 1/08; B31B 50/20; B31B 50/22; B31B 50/142; B31B 50/252; B21D 53/64; B21D 37/205; B23P 15/406; B23D 61/125; B23D 61/122
USPC ...... 76/107.1, 107.8, 116; 83/695, 673, 620, 83/660; 493/363, 372, 473, 475; 451/546
See application file for complete search history.

(56) References Cited

U.S. PATENT DOCUMENTS 1,260,820 A * 3/1918 Scott ......................... B26F 1/40 83/128
1,274,255 A * 7/1918 Freas ................... B23D 61/023 83/838

(Continued)

FOREIGN PATENT DOCUMENTS

EP 2851169 A1 * 3/2015 ................ B26F 1/44
WO WO-9825738 A1 * 6/1998 ............. B65H 35/04

*Primary Examiner* — Joshua G Kotis
(74) *Attorney, Agent, or Firm* — Procopio, Cory, Hargreaves & Savitch LLP

(57) ABSTRACT

A rule to be inserted into a die-board that is pressed onto a plate matter, the rule including: a multi-edge cutting blade having a cutting blade edge, the cutting blade edge divided into multiple sections with multiple spacings between the multiple sections; and a plurality of connecting pieces configured to fit into the multiple spacings and to provide support for the multiple sections of the cutting blade edge when the rule is pressed onto the plate matter.

12 Claims, 7 Drawing Sheets

(51) Int. Cl.
*B31B 50/26* (2017.01)
*B31B 50/36* (2017.01)

(56) References Cited

U.S. PATENT DOCUMENTS

| | | | | | |
|---|---|---|---|---|---|
| 1,278,630 | A * | 9/1918 | Freas | B23D 61/023 | 83/838 |
| 2,328,109 | A * | 8/1943 | Thompson | B26F 1/20 | 428/43 |
| 2,993,421 | A * | 7/1961 | Phillips | B26F 1/44 | 493/473 |
| 3,122,030 | A * | 2/1964 | Metzger | B28D 1/121 | 76/112 |
| 3,363,617 | A * | 1/1968 | Hoerer | B28D 1/121 | 125/15 |
| 3,513,821 | A * | 5/1970 | Bouvier | B23D 61/026 | 125/15 |
| 3,763,601 | A * | 10/1973 | Schwarzkopf | B23D 61/026 | 451/542 |
| 4,012,978 | A * | 3/1977 | de Lanauze | B26F 1/44 | 83/698.41 |
| 4,219,915 | A * | 9/1980 | Scott | B23D 71/04 | 407/29.1 |
| 4,265,037 | A * | 5/1981 | Lamouric | E02F 9/2866 | 152/402 |
| 5,012,792 | A * | 5/1991 | Kawata | B23D 61/021 | 125/15 |
| 5,117,721 | A * | 6/1992 | Montrose | B21D 53/64 | 76/107.8 |
| 5,524,930 | A * | 6/1996 | Foster | B26F 1/18 | 281/21.1 |
| 5,533,431 | A * | 7/1996 | Schickling | B26D 1/0006 | 83/347 |
| 5,537,905 | A * | 7/1996 | Zimmer | B26D 1/0006 | 83/660 |
| 5,582,571 | A * | 12/1996 | Simpson | B26F 1/18 | 493/355 |
| 5,868,057 | A * | 2/1999 | Kapolnek | B26F 1/18 | 83/346 |
| 6,523,448 | B1 * | 2/2003 | Chang | B26D 7/025 | 83/653 |
| 2016/0121507 | A1 * | 5/2016 | Smithwick | B26F 1/20 | 83/882 |

* cited by examiner

CUT-CREASE RULE FOR DIEBOARD

CROSS-REFERENCE TO RELATED APPLICATIONS

This application claims the benefit of priority under 35 U.S.C. § 119(e) of U.S. Provisional Patent Application No. 62/437,564, filed Dec. 21, 2016, entitled "Cut-Crease Rule for Dieboard." The disclosure of the above-referenced application is incorporated herein by reference.

BACKGROUND

Technological Field

The present disclosure relates to rules for a die-board, and more specifically, to cut-crease rules for the die-board.

Background

In die-board applications, a strip of material (referred to as a rule) is used to form a shape to be inserted into a die-board. The rule includes a blade on one side for cutting. Thus, the shape is used to stamp the material to be cut or folded. For example, as shown in FIG. 1A, a cutting blade (or rule) 100 is attached to a pattern board 110 for use in pressing a folding or a cutting line on plate matters such as paper, canvas, leather, plastic, etc. The plate matters with such pressed folding and/or cutting lines (i.e., the pressed lines) can be used in a folded shape like a box (e.g., a pizza box), card (e.g., a greeting card), or other similar items. Accordingly, in order to assemble the plate matter into a predetermined shape with the rule 100, it is necessary to process (e.g., cut into proper length) the rule 100 into a shape suitable for forming the pressed lines.

FIG. 1B shows the pattern board 110 in an up-side down position for pressing onto the plate matter 120.

SUMMARY

This disclosure describes apparatus related to cut-crease rules for a die-board.

In one embodiment, a rule to be inserted into a die-board that is pressed onto a plate matter is disclosed. The rule includes: a multi-edge cutting blade having a cutting blade edge, the cutting blade edge divided into multiple sections with multiple spacings between the multiple sections; and a plurality of connecting pieces configured to fit into the multiple spacings and to provide support for the multiple sections of the cutting blade edge when the rule is pressed onto the plate matter.

In another embodiment, a die-board having slots and used to press onto a plate matter is disclosed. The die-board includes: a plurality of rules inserted into the slots, wherein each rule of the plurality of rules includes: a multi-edge cutting blade divided into multiple sections with multiple spacings between the multiple sections; and a plurality of connecting pieces configured to fit into the multiple spacings and to provide support for the multiple sections of the multi-edge cutting blade when the die-board is pressed onto the plate matter.

Other features and advantages of the present disclosure should be apparent from the following description which illustrates, by way of example, aspects of the disclosure.

BRIEF DESCRIPTION OF THE DRAWINGS

The details of the present disclosure, both as to its structure and operation, may be gleaned in part by study of the accompanying drawings.

DETAILED DESCRIPTION

Figure 1A:
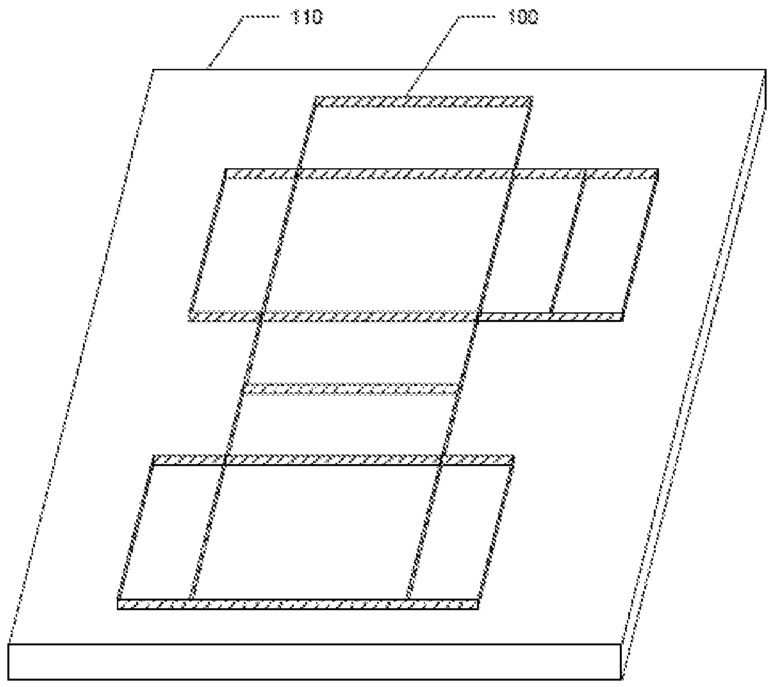
FIG. 1A (PRIOR ART)
FIG. 1A shows a cutting blade (or rule) attached to a pattern board for use in pressing a folding or a cutting line on plate matters.
Figure 1B:
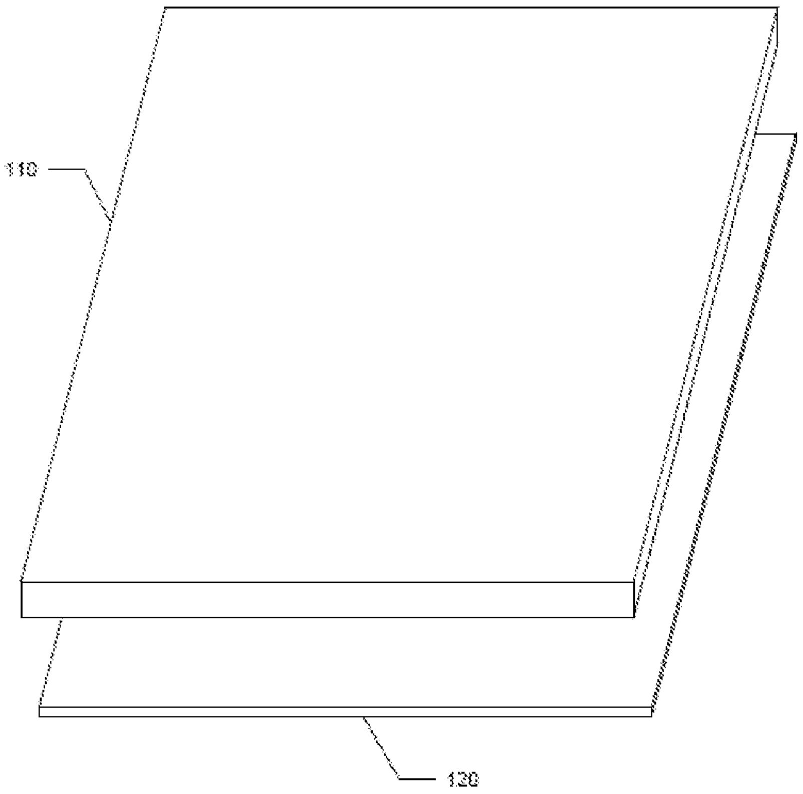
FIG. 1B (PRIOR ART)
FIG. 1B shows the pattern board in an up-side down position for pressing onto the plate matter.

Apparatus and methods for preparing cut-crease rules or blades (as well as cut crease rules or blades) used for a die board are described. The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. In some instances, well-known structures and components are shown in simplified form for brevity of description. As used herein, like reference numerals refer to like features throughout the written description.

Figure 2A:
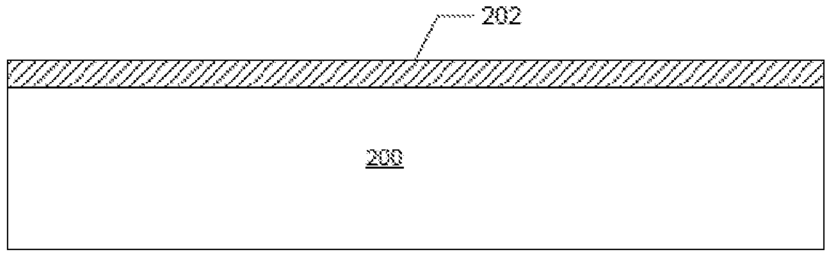
FIG. 2A shows a blade (or rule) which includes a cutting blade edge on one side of the rule or blade.

FIG. 2A shows a blade (or rule) 200 which includes a cutting blade edge 202 on one side of the rule or blade 200. In general, the cutting blade edge 202 that is sharp can be used to make a cutting line on the plate matter, while the cutting blade edge 202 that is dull can be used to make a folding line on the plate matter.

Figure 2B:
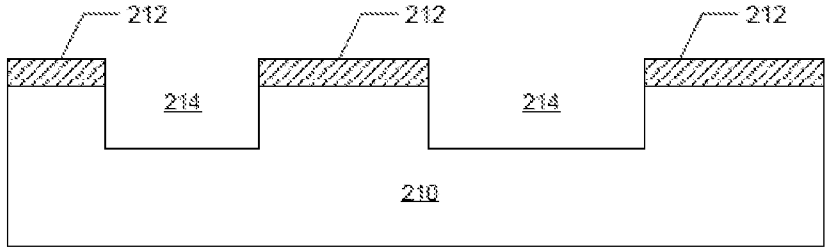
FIG. 2B shows a blade which can be made with a cutting blade edge that is cut so that the cutting blade edge is divided into multiple sections with spacings between the edges.

In some cases, it may be desirable to make a perforated line on the plate matter for folding or cutting. In these cases, a blade 210 can be made with a cutting blade edge 212 that is cut so that the cutting blade edge 212 is divided into multiple sections with spacings 214 between the edges 212, as shown in FIG. 2B.

Figure 2C:
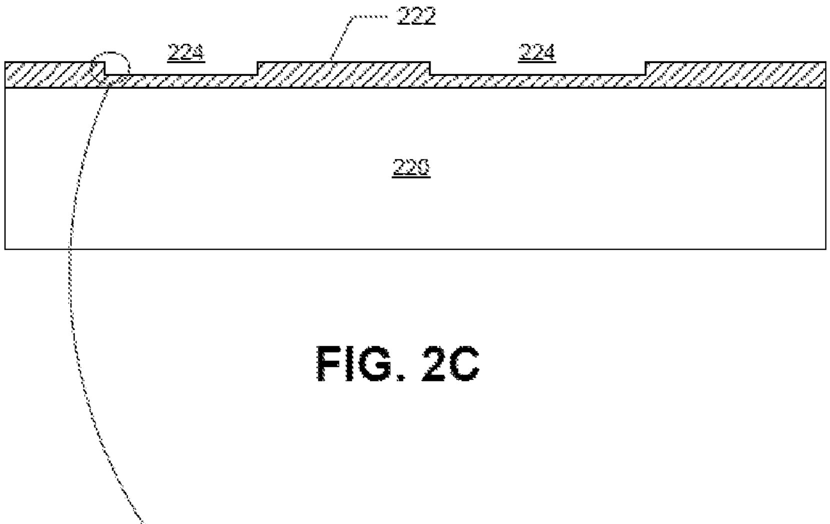
FIG. 2C shows the cuts that are made only on the cutting blade edge of the blade.

In other cases in which the perforated line needs to be fine and not so deep, the cuts 224 are made only on the cutting blade edge 222 of the blade 220, as shown in FIG. 2C. The design of the blade 220 with the cutting blade edge 222 shown in FIG. 2C can be referred to as a "multi-edge" cutting blade 220.

Figure 2D:
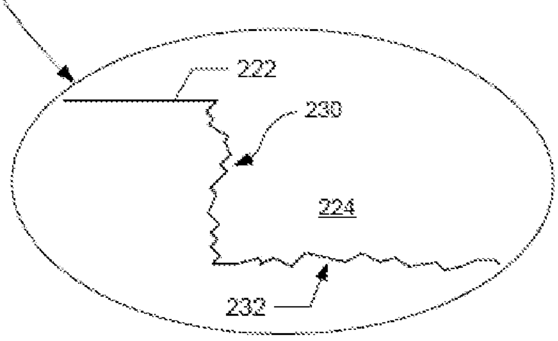
FIG. 2D shows the finished cuts having jagged edges.

However, since the cuts 224 in the multi-edge cutting blade 220 are made by pressing or stamping the generally thin cutting blade edge 222, the finished cuts 224 include jagged edges 230, 232, as shown in FIG. 2D. Thus, when the blade 220 is used to press the plate matter, in some cases, parts of the plate matter get stuck in the jagged edges 230, 232 and the pressed lines cannot be made clean.

Accordingly, to address the issues with the multi-edge cutting blade as stated above, attempts have been made to manufacture multi-edge cutting blades without cuts made on the cutting blade edge.

Figure 3:
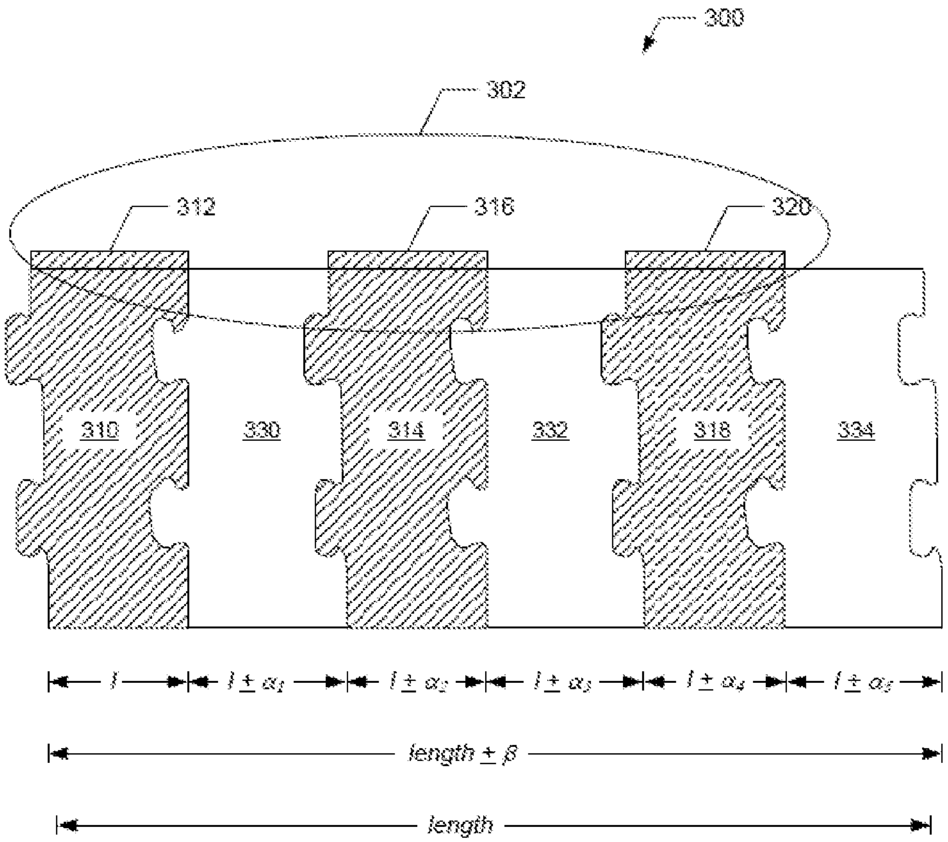
FIG. 3 shows a multi-edge cutting blade with multiple cutting edges configured without the cuts made on the cutting blade edge in accordance with one implementation of the present disclosure.

For example, FIG. 3 shows a multi-edge cutting blade 300 with multiple cutting edges 302 configured without the cuts made on the cutting blade edge in accordance with one implementation of the present disclosure. In this example, the blade 300 is made with a first plurality of pieces 310, 314, 318 with corresponding cutting blade edges 312, 316, 320, respectively, and a second plurality of pieces 330, 332, 334 without cutting blade edges. Thus, by: (1) connecting the piece 310 (with blade edge 312) to the piece 330; (2) connecting the piece 330 to the piece 314 (with blade edge 316); (3) connecting the piece 314 to the piece 332; (4) connecting the piece 332 to the piece 318 (with blade edge 320); and (5) connecting the piece 318 to the piece 334, the multi-edge cutting blade 300 is made without the cuts made on the cutting blade edge. Thus, the first plurality of pieces and the second plurality of pieces are made to fit into each other.

However, multi-edge cutting blades such as the multi-edge cutting blade 300 shown in FIG. 3 have problems generating the blade length that is fixed due to variable lengths of the pieces.

For example, in FIG. 3, the desired length of the blade 300 is 'length'. However, although the pieces 310, 314, 318 are made to length 'l', for example, while the pieces 330, 332, 334 are made to length '$l\pm\alpha$', for example, the actual length of each piece may vary such that the resultant length of the blade 300 may result in '$length\pm\beta$' instead of 'length'. Thus, in one example, FIG. 3 shows that the actual length of the piece 310 is 'l', the actual length of the piece 330 is '$l\pm\alpha_1$', the actual length of the piece 314 is '$l\pm\alpha_2$', the actual length of the piece 332 is '$l\pm\alpha_3$', the actual length of the piece 318 is '$l\pm\alpha_4$', and the actual length of piece 334 is '$l\pm\alpha_5$'.

Figure 4A:
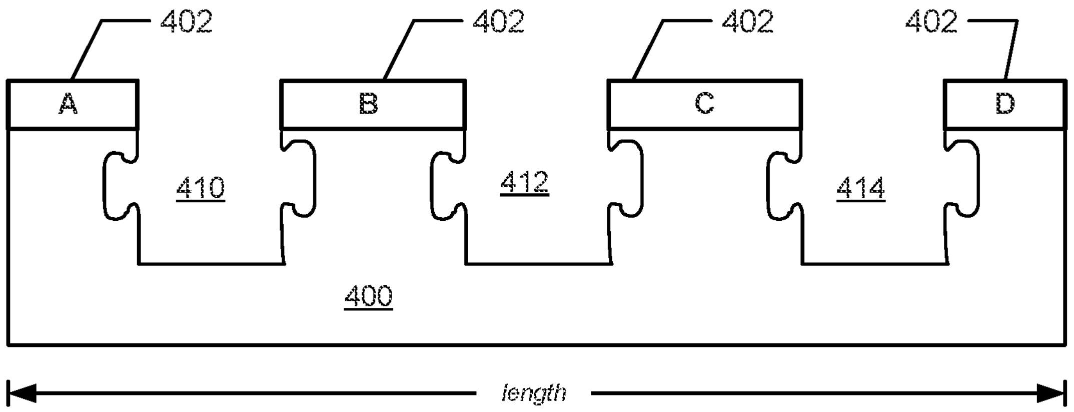
FIG. 4A shows a fixed-length multi-edge cutting blade made as a single piece having a blade edge and pressing pieces fit into the single pieces instead of the multiple pieces (such as shown in FIG. 3) in accordance with one implementation of the present disclosure.
Figure 4B:
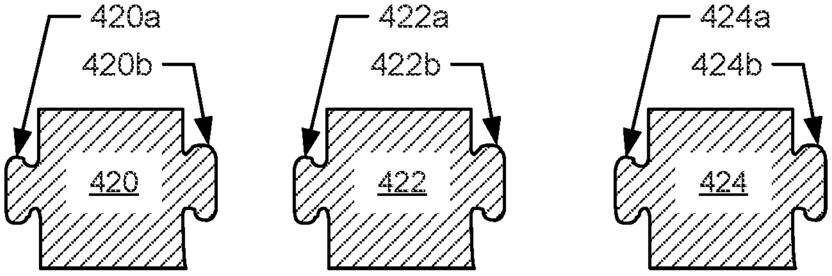
FIG. 4B shows pieces that would fit into the spacings shown in FIG. 4A.
Figure 4C:
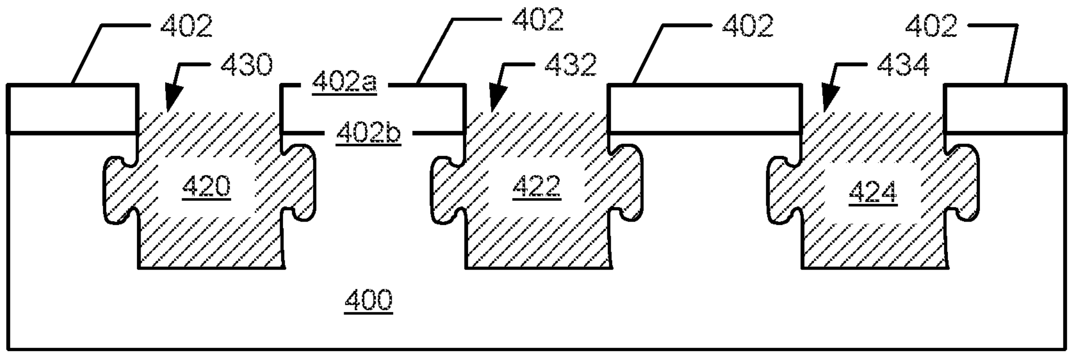
FIG. 4C shows the fixed-length multi-edge cutting blade with the pieces fitted into the spacings in accordance with one implementation of the present disclosure.

Accordingly, when a fixed-length multi-edge cutting blade is desired, the implementation of FIG. 3 needs to be modified. FIGS. 4A through 4C show one example of a fixed-length multi-edge cutting blade in accordance with one implementation of the present disclosure.

In the illustrated implementation of FIG. 4A, the fixed-length multi-edge cutting blade 400 is made as a single piece having a blade edge and pressing pieces fit into the single pieces instead of the multiple pieces as shown in FIG. 3. Thus, in FIG. 4A, the blade 400 can be made with a cutting blade edge 402 that is cut so that the cutting blade edge 402 is divided into multiple sections with spacings 410, 412, 414 between the edge sections 402.

FIG. 4B shows pieces 420, 422, 424 that would fit into the spacings 410, 412, 414 shown in FIG. 4A.

FIG. 4C shows the fixed-length multi-edge cutting blade 400 with the pieces 420, 422, 424 fitted into the spacings 410, 412, 414. In the illustrated implementation of FIG. 4C, the pieces 420, 422, 424 fit such that the top of each piece 420, 422, or 424 reaches a point slightly lower than the top of the edge sections 402. In the illustrated embodiment of FIGS. 4A to 4C, each of the pieces 420, 422, 424 are shaped with ears to fit into the spacing.

Accordingly, this configuration of the blade 400 provides a configuration similar to the desired configuration shown in FIG. 2C, but without the jagged edges due to the cuts made on the cutting blade edge. Further, this configuration of the blade 400 provides a configuration similar to the configuration shown in FIG. 3, but with the desired fixed overall length of the blade.

Thus, in one implementation (e.g., the illustrated implementation of FIGS. 4A to 4C), a rule 400 to be inserted into a die-board that is pressed onto a plate matter is disclosed. The rule 400 includes a multi-edge cutting blade 402 having a cutting blade edge divided into multiple sections (A, B, C, D) with multiple spacings 410, 412, 414 between the multiple sections, and a plurality of connecting pieces 420, 422, 424 configured to fit into the multiple spacings 410, 412, 414 and to provide support for the multiple sections (A, B, C, D) of the cutting blade edge when the multi-edge cutting blade is pressed onto the plate matter.

In one implementation, the multiple spacings 410, 412, 414 and the plurality of connecting pieces 420, 422, 424 are shaped to attach to each other firmly so that the plurality of connecting pieces does not fall out the multiple spacings between the multiple sections (A, B, C, D) of the cutting blade edge. In one implementation, the multi-edge cutting blade 402 is formed with a single piece fixed-length blade 400. In one implementation, the plurality of connecting pieces 420, 422, 424 fits into the multiple spacings 410, 412, 414 such that a top 430, 432, or 434 of each piece 420, 422, or 424 of the plurality of connecting pieces is between a top **402*a* and a bottom 402*b* of the cutting blade edge. In one implementation, the plurality of connecting pieces is formed with ears 420*a*, 420*b*, 422*a*, 422*b*, 424*a*, 424*b*** on sides to fit into the spacings.

Figure 5:
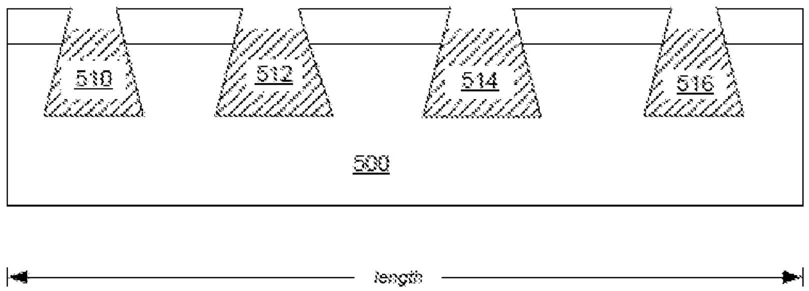
FIG. 5 shows the pieces which fit into the spaces of the blade using the tapered sides in accordance with one implementation of the present disclosure.
Figure 6:
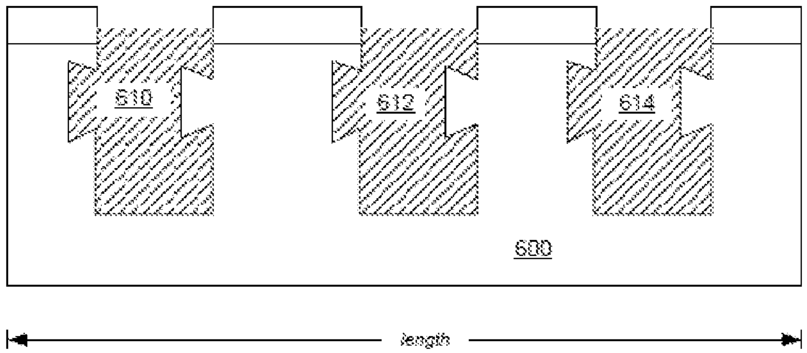
FIG. 6 the pieces which fit into the spaces of the blade using the dovetail sides in accordance with one implementation of the present disclosure.

FIGS. 5 and 6 are alternative implementations of a fixed-length multi-edge cutting blade 500, 600.

In FIG. 5, the pieces 510, 512, 514, 516 fit into the spaces of the blade 500 using the tapered sides in accordance with one implementation of the present disclosure.

In FIG. 6, the pieces 610, 612, 614 fit into the spaces of the blade 600 using the dovetail sides in accordance with one implementation of the present disclosure.

The above descriptions of the disclosed embodiments are provided to enable any person skilled in the art to make or use the disclosure. Various modifications to these embodiments will be readily apparent to those skilled in the art, and the generic principles described herein can be applied to other embodiments without departing from the spirit or scope of the disclosure. For example, although the examples show only three different shapes of the pieces, other shapes of the pieces can be configured using the apparatus and methods as described in the description section of the present disclosure. Thus, it will be understood that the description and drawings presented herein represent embodiments of the disclosure and are therefore representative of the subject matter which is broadly contemplated by the present disclosure. It will be further understood that the scope of the present disclosure fully encompasses other embodiments that may become obvious to those skilled in the art and that the scope of the present disclosure is accordingly limited by nothing other than the appended claims.

Accordingly, the foregoing embodiments are merely presented as examples and are not to be construed as limiting the present disclosure. The present teachings can be readily applied to other types of apparatus and/or devices. The description of the present disclosure is intended to be illustrative, and not to limit the scope of the claims. Many alternatives, modifications, and variations will be apparent to those skilled in the art.

What is claimed is:

1. A rule to be inserted into a die-board that is pressed onto a plate matter, the rule comprising:

a height defined in a height direction, a thickness defined in a thickness direction, and a length defined in a length direction, a multi-edge cutting blade having a plurality of cutting blade edges and a non-cutting edge opposite the plurality of cutting blade edges, wherein the non-cutting edge inserts into the die-board, wherein the multi-edge cutting blade is formed from a single piece blade, wherein each edge of the plurality of cutting blade edges is separated from at least one adjacent edge of the plurality of cutting blade edges by a predetermined spacing, wherein the separation between the plurality of cutting blade edges forms at least one predetermined spacing, wherein each of the at least one predetermined spacing is formed by a cut in the rule that extends deeper than a depth of each of the plurality of cutting blade edges, wherein the depth is measured from a tip of each cutting blade edge in the height direction of the rule; and a plurality of connecting pieces, each connecting piece configured to fit into the at least one predetermined spacing and to provide support for the plurality of cutting blade edges when the rule is pressed onto the plate matter, wherein tops of the plurality of connecting pieces are lower in the height direction than tops of the plurality of cutting blade edges but are higher in the height direction than bottoms of the plurality of cutting blade edges such that the plurality of connecting pieces does not make cuts on the plate matter, wherein each of the plurality of connecting pieces fits into the at least one predetermined spacing and extend below the cutting blade edges in the height direction, wherein the plurality of connecting pieces comprise side portions formed as one of tapered sides, ear shaped sides, or dovetail shaped sides, wherein said side portions extend in the length direction such that the side portions extend below a top of a respective cutting blade edge of the plurality of cutting blade edges in the height direction.

2. The rule of claim 1, wherein the at least one predetermined spacing and each of the plurality of connecting pieces are shaped to attach to each other so that the plurality of connecting pieces does not fall out of the at least one predetermined spacing of the single piece blade.

3. The rule of claim 1, wherein each of the plurality of connecting pieces fits into the at least one predetermined spacing such that the tops of the plurality of connecting pieces are positioned between the tops and bottoms of the plurality of cutting blade edges.

4. The rule of claim 1, wherein each of the plurality of connecting pieces is formed with ears on sides to fit into the at least one predetermined spacing.

5. The rule of claim 1, wherein each of the plurality of connecting pieces is formed with tapered sides to fit into the at least one predetermined spacing.

6. The rule of claim 1, wherein each of the plurality of connecting pieces is formed with dovetail sides to fit into the at least one predetermined spacing.

7. A die-board having slots and used to press onto a plate matter, the die-board comprising:

a plurality of rules inserted into the slots, wherein each rule of the plurality of rules comprises:

a height defined in a height direction, a thickness defined in a thickness direction, and a length defined in a length direction, a multi-edge cutting blade having a plurality of cutting blade edges and a non-cutting edge, wherein the non-cutting edge inserts into the dieboard, wherein the multi-edge cutting blade is formed from a single piece blade, wherein each edge of the plurality of cutting blade edges is separated from at least one adjacent edge of the plurality of cutting blade edges by a predetermined spacing, wherein the separation between the plurality of cutting blade edges forms at least one predetermined spacing, wherein each of the at least one predetermined spacing is formed by a cut in the rule that extends deeper than a depth of each of the plurality of cutting blade edges, wherein the depth is measured from a tip of each cutting blade edge in the height direction of the rule; and a plurality of connecting pieces, each connecting piece configured to fit into the at least one predetermined spacing and to provide support for the plurality of cutting blade edges when the die-board is pressed onto the plate matter, wherein tops of the plurality of connecting pieces are lower in the height direction than tops of the plurality of cutting blade edges but are higher in the height direction than bottoms of the plurality of cutting blade edges such that the plurality of connecting pieces does not make cuts on the plate matter, wherein each of the plurality of connecting pieces fits into the at least one predetermined spacing and extend below the cutting blade edges in the height direction, wherein the plurality of connecting pieces comprise side portions formed as one of tapered sides, ear shaped sides, or dovetail shaped sides, wherein said side portions extend in the length direction such that the side portions extend below a top of a respective cutting blade edge of the plurality of cutting blade edges in the height direction.

8. The die-board of claim 7, wherein the at least one predetermined spacing and each of the plurality of connecting pieces are shaped to attach to each other.

9. The die-board of claim 7, wherein each of the plurality of connecting pieces fits into the at least one predetermined spacing such that tops of the plurality of connecting pieces are positioned between tops and bottoms of the plurality of cutting blade edges.

10. The die-board of claim 7, wherein each of the plurality of connecting pieces is formed with ears on sides to fit into the at least one predetermined spacing.

11. The die-board of claim 7, wherein each of the plurality of connecting pieces is formed with tapered sides to fit into the at least one predetermined spacing.

12. The die-board of claim 7, wherein each of the plurality of connecting pieces is formed with dovetail sides to fit into the at least one predetermined spacing.

* * * * *